United States Patent
Roake et al.

(10) Patent No.: US 10,892,890 B2
(45) Date of Patent: Jan. 12, 2021

(54) HASH OFFSET BASED KEY VERSION EMBEDDING

(71) Applicant: EntIT Software LLC, Sunnyvale, CA (US)

(72) Inventors: Timothy Roake, Sunnyvale, CA (US); Cheryl He, Sunnyvale, CA (US); Luther Martin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 232 days.

(21) Appl. No.: 15/720,857

(22) Filed: Sep. 29, 2017

(65) Prior Publication Data

US 2019/0103959 A1    Apr. 4, 2019

(51) Int. Cl.
*H04L 9/00*    (2006.01)
*H04L 9/08*    (2006.01)
*H04L 9/06*    (2006.01)
*H04L 9/32*    (2006.01)

(52) U.S. Cl.
CPC .......... *H04L 9/0822* (2013.01); *H04L 9/0643* (2013.01); *H04L 9/0894* (2013.01); *H04L 9/3239* (2013.01); *H04L 9/3242* (2013.01)

(58) Field of Classification Search
CPC .... H04L 9/0822; H04L 9/0643; H04L 9/3242
USPC ........................................................ 380/277
See application file for complete search history.

(56) References Cited

U.S. PATENT DOCUMENTS

| 7,392,399 B2* | 6/2008 | Grohoski | G06F 9/3879 |
| | | | 712/E9.067 |
| 8,891,768 B2 | 11/2014 | Pogmore | |
| 9,208,491 B2 | 12/2015 | Spies et al. | |
| 2009/0210722 A1* | 8/2009 | Russo | H04L 9/0866 |
| | | | 713/189 |
| 2013/0077780 A1 | 3/2013 | Rogaway | |

OTHER PUBLICATIONS

Tiziano Bianchi; TTP-Free Asymmetric Fingerprinting Based on Client Side Embedding; IEEE Transactions on Information Forensics and Security, vol. 9, No. 10, Oct. 2014; p. 1557-1568 (Year: 2014).*

Gollakota, S. et al., "Secure In-band Wireless Pairing", Jun. 9, 2016, pp. 16. https://people.csail.mit.edu/nickolai/papers/gollakota-tep.pdf.

* cited by examiner

*Primary Examiner* — Monjur Rahim

(57) ABSTRACT

In some examples, with respect to hash offset based key version embedding, data that is to be encrypted may be ascertained, and a key, including a key version, that is to be used to encrypt the ascertained data may be ascertained. Encrypted data may be generated by encrypting the ascertained data based on the ascertained key, and hashed encrypted data may be generated by performing a hash operation on the encrypted data. Further, offset hashed encrypted data may be generated by embedding the key version into the hashed encrypted data, and the offset hashed encrypted data including the embedded key version may be stored.

20 Claims, 8 Drawing Sheets

| Type | Number of result bits |
|---|---|
| CRC-16 | 16 |
| Checksum-16 | 16 |
| MD5 | 128 |
| Secure Hash Algorithm 1 | 160 |
| Secure Hash Algorithm 256 | 254 |

FIG. 2

| Data Set Hex Value | MD5 (in Hexadecimal) |
|---|---|
| 3030 | B4B147BC522828731F1A016BFA72C073 |
| 3031 | 96A3BE3CF272E017046D1B2674A52BD3 |
| 3032 | A2EF406E2C2351E0B9E80029C909242D |

FIG. 3

HASH OFFSET BASED KEY VERSION EMBEDDING

BACKGROUND

Encryption may be described as the process of encoding or altering information so as to limit access to the information to an authorized entity. If an unauthorized entity ascertains the encrypted information, absent a key that is used to decrypt the encrypted information, the encrypted information may be unintelligible to the unauthorized entity. The encrypted information may be referred to as ciphertext. The key may be generated by a process that generates pseudo-random encryption keys.

BRIEF DESCRIPTION OF DRAWINGS

Features of the present disclosure are illustrated by way of example and not limited in the following figure(s), in which like numerals indicate like elements, in which:

FIG. 2 illustrates a table including different types of hash techniques;

FIG. 3 illustrates a table including data values and corresponding hashed values;

DETAILED DESCRIPTION

Figure 1:
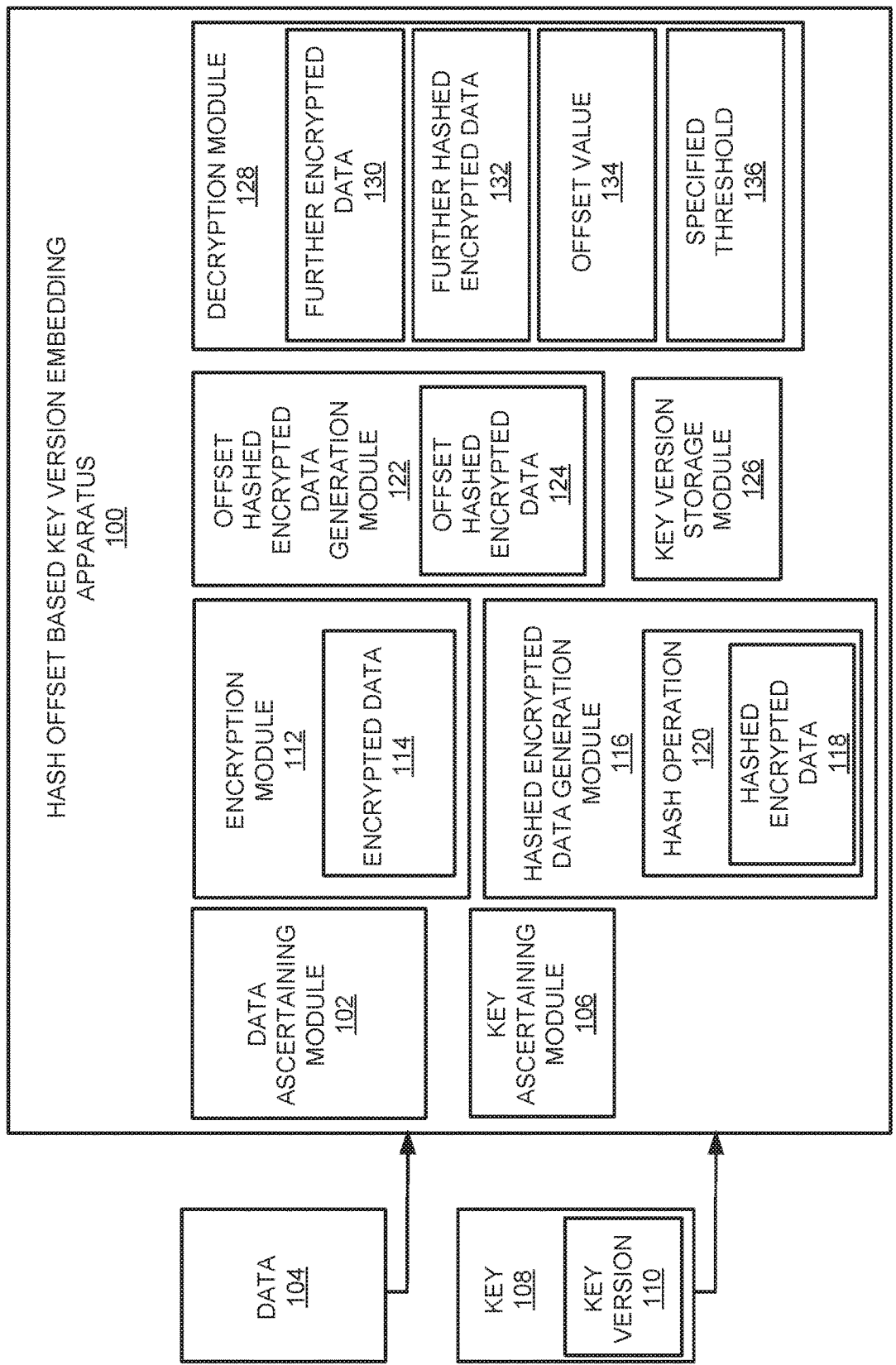
FIG. 1 illustrates an example layout of a hash offset based key version embedding apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Hash offset based key version embedding apparatuses, methods for hash offset based key version embedding, and non-transitory computer readable media having stored thereon machine readable instructions to provide hash offset based key version embedding are disclosed herein. The apparatuses, methods, and non-transitory computer readable media disclosed herein provide for the storage of a key version in a hash of encrypted data.

With respect to data encryption, encrypted data may be stored along with a matching hash of that data to ensure data integrity. The encryption function may use a single key. However, for security purposes, the key may be selected from a set of possible keys. In order to enable this encryption technique, a key version of the selected key may also need to be stored for decryption of the encrypted data. However, key version data fields may not be available for storage of a key version. Moreover, updating data schema to include the key version may add technical challenges to the storage of the key version.

In order to address at least these technical challenges with respect to storage of a key version, the apparatuses, methods, and non-transitory computer readable media disclosed herein may use an offset to a hash value to indicate the key version, thus obviating the need for separate storage of the key version, and/or data schema changes. In this regard, the offset may be used to store the key version by adding the key version to a hash value of data that has been encrypted by a key including the key version. During a decryption process, an offset value may be determined and compared to a threshold (e.g., defined by a number of total keys) to validate a key version that is to be used to retrieve a key to decrypt encrypted data. Thus, by storage of the key version by using an offset to a hash value to indicate the key version, key version security is increased in that the need for a secondary storage source for the key version is eliminated.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a hash offset based key version embedding apparatus (hereinafter also referred to as "apparatus 100").

Referring to FIG. 1, the apparatus 100 may include a data ascertaining module 102 to ascertain data 104 that is to be encrypted.

A key ascertaining module 106 is to ascertain a key 108, including a key version 110, that is to be used to encrypt the data 104.

An encryption module 112 is to generate encrypted data 114 by encrypting the data 104 based on the ascertained key 108.

A hashed encrypted data generation module 116 is to generate hashed encrypted data 118 by performing a hash operation 120 on the encrypted data 114. According to an example, the hashed encrypted data 118 may represent a checksum of the encrypted data 114.

An offset hashed encrypted data generation module 122 is to generate offset hashed encrypted data 124 by embedding the key version 110 into the hashed encrypted data 118.

According to an example, the offset hashed encrypted data generation module 122 is to generate the offset hashed encrypted data 124 by adding a value of the key version 110 to the hashed encrypted data 118. According to an example, the offset hashed encrypted data 124 may represent a value that is offset from the hashed encrypted data 118 by another value corresponding to the key version 110.

A key version storage module 126 is to store the offset hashed encrypted data 124 including the embedded key version 110.

With respect to decryption of the encrypted data 114, a decryption module 128 is to ascertain further encrypted data 130. According to an example, the encrypted data 114 may be the same as the further encrypted data 130. However, since the further encrypted data 130 may be ascertained at a later time after generation of the offset hashed encrypted data 124, it may be unknown whether the encrypted data 114 is the same as the further encrypted data 130.

The decryption module 128 is to generate further hashed encrypted data 132 by performing the hash operation 120 on the further encrypted data 130. In this regard, the decryption module 128 may operate in conjunction with the hashed encrypted data generation module 116.

The decryption module 128 is to ascertain the offset hashed encrypted data 124.

The decryption module 128 is to determine an offset value 134 by subtracting the further hashed encrypted data 132 from the offset hashed encrypted data 124.

The decryption module 128 is to validate that the offset value 134 corresponds to the key version 110 by determining whether the offset value 134 is less than or equal to a specified threshold 136. According to an example, the specified threshold 136 may correspond to a total number of key versions including the key version 110.

In response to a determination that the offset value 134 is less than or equal to the specified threshold 136, the decryption module 128 is to ascertain the key 108 corresponding to the offset value 134.

Alternatively, in response to a determination that the offset value 134 is greater than the specified threshold 136, the decryption module 128 is to indicate that the offset value 134 does not correspond to the key version 110.

Further, the decryption module 128 is to decrypt the further encrypted data 130 based on the ascertained key 108 corresponding to the offset value 134.

Referring to FIGS. 1-6, operation of the elements of the apparatus 100 is described in further detail.

With respect to storage of the key version 110 in a hash of the encrypted data 114, the hash of the encrypted data 114 may be used to ensure the integrity of the encrypted data 114, and this hash may be determined at any time on the encrypted data 114. The determined hash would need to match a stored hash exactly to confirm that the encrypted data 114 indeed represents an appropriate encryption of the data 104. However, for the apparatus 100, a relatively small offset is added to the hash to generate the offset hashed encrypted data 124, and the determined hash may be analyzed to confirm whether the hash is within the known size of the maximum offset (e.g., the specified threshold 136). This confirmation may represent a reasonable check of integrity. The offset value 134 may be used as the key version indicator as disclosed herein.

FIG. 2 illustrates a table including different types of hash techniques.

Referring to FIG. 2, the hash operation 120 may implement various types of hash techniques (e.g., cyclic redundancy check (CRC), checksum, MD5, etc.) to generate the hashed encrypted data 118. The size, or number of bits, of the resulting hash may depend on the hash type.

FIG. 3 illustrates a table including data values and corresponding hashed values.

Referring to FIG. 3, a feature of hash operations, such as the hash operations illustrated in FIG. 2, is that relatively small changes (even one-bit changes) in the original data 104 may change the result completely. Examples for the MD5 hash operation 120 on a data set are shown in FIG. 3. As the input value changes by just one bit (e.g., from 3030 to 3031, or from 3031 to 3032), the hash value changes completely. This allows for the use of the apparent randomness of the output hash value to add the key version information to the hash value. In this case, the key version 110 may be added as an offset to generate the offset hashed encrypted data 124 so that the data being hashed (e.g., the encrypted data 114) almost certainly matches the offset hashed encrypted data 124.

Figure 4:
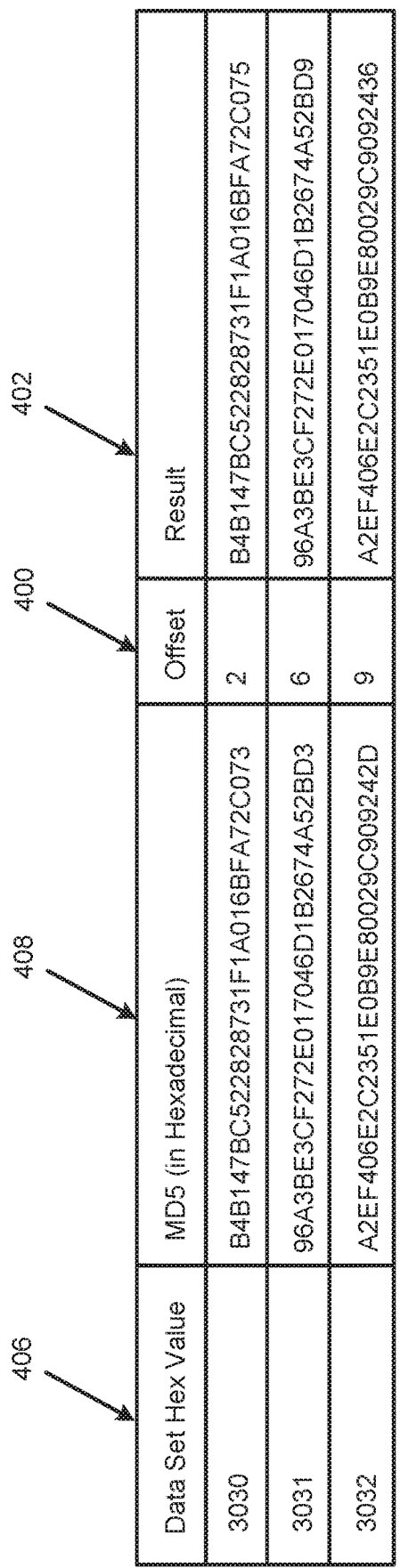
FIG. 4 illustrates a table including application of an offset to the hashed values of FIG. 3 to illustrate operation of the hash offset based key version embedding apparatus of FIG. 1.

FIG. 4 illustrates a table including application of an offset to the hashed values of FIG. 3 to illustrate operation of the apparatus 100.

Referring to FIG. 4, for the hash example of FIG. 3, the offsets as shown at 400 are added. The resulting hash at 402 shows that the first 15 bytes remain the same. The offset at 400 may also be retrieved by performing an MD5 hash operation on the data at 406, and subtracting the result at 408 from the offset-applied hash at 402 to retrieve the offset at 400. If the offset is within a pre-defined range (e.g., the specified threshold 136), then it may be reasonably concluded that the hash value at 402 matches the hash at 408 of the data at 406.

Figure 5:
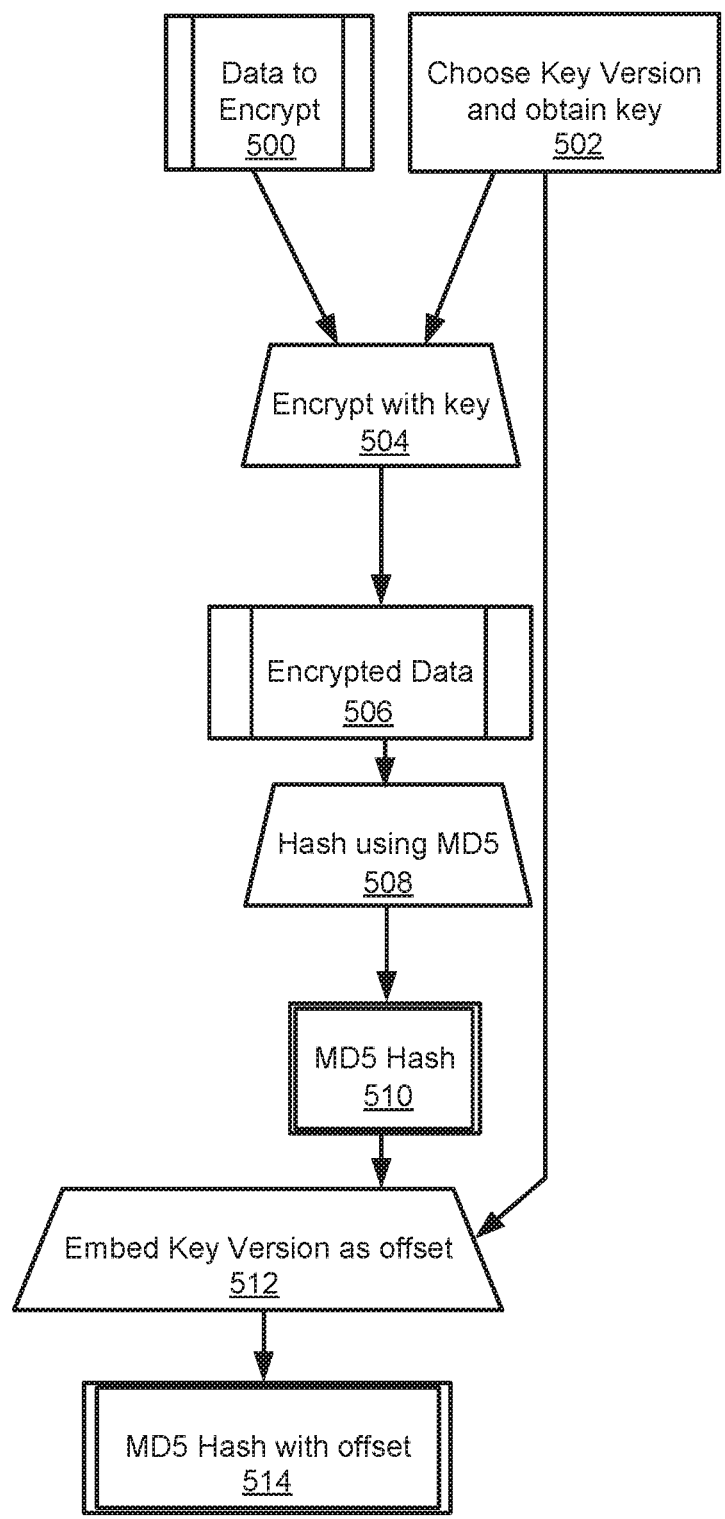
FIG. 5 illustrates an encryption flowchart to illustrate operation of the hash offset based key version embedding apparatus of FIG. 1.

FIG. 5 illustrates an encryption flowchart to illustrate operation of the hash offset based key version embedding apparatus of FIG. 1.

Referring to FIG. 5, at block 500, the data ascertaining module 102 is to ascertain the data 104 that is to be encrypted.

At block 502, the key ascertaining module 106 is to ascertain the key 108, including the key version 110, that is to be used to encrypt the data 104. For example, the key version 110 may be "9".

At block 504, the encryption module 112 is to generate the encrypted data 114 (e.g., see also block 506) by encrypting the data 104 based on the ascertained key 108.

At block 508, the hashed encrypted data generation module 116 is to generate hashed encrypted data 118 (e.g., see also block 510) by performing the hash operation 120 (e.g., MD5) on the encrypted data 114. For example, the hashed encrypted data 118 may be "7d093334ba0323c9ffa2956542a9355c".

At block 512, the offset hashed encrypted data generation module 122 is to generate the offset hashed encrypted data 124 (e.g., see also block 514) by embedding the key version 110 into the hashed encrypted data 118. For example, the offset hashed encrypted data 124 may be "7d093334ba0323c9ffa2956542a93565".

Figure 6:
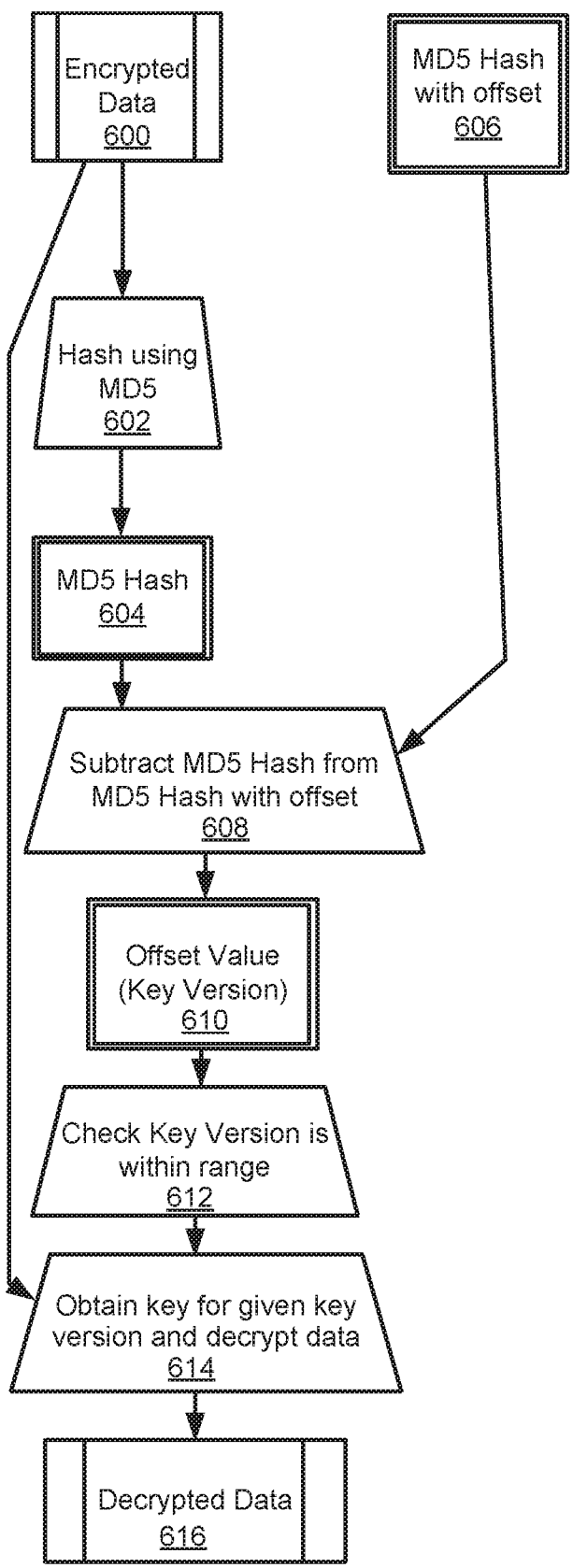
FIG. 6 illustrates a decryption flowchart to illustrate operation of the hash offset based key version embedding apparatus of FIG. 1.

FIG. 6 illustrates a decryption flowchart to illustrate operation of the hash offset based key version embedding apparatus of FIG. 1.

Referring to FIG. 6, at block 600, the decryption module 128 is to ascertain the further encrypted data 130.

At block 602, the decryption module 128 is to generate the further hashed encrypted data 132 (e.g., see also block 604) by performing the hash operation 120 (e.g., the MD5 hash operation as shown in FIG. 5) on the further encrypted data 130. For example, the further hashed encrypted data 132 may be "7d093334ba0323c9ffa2956542a9355c".

At block 606, the decryption module 128 is to ascertain the offset hashed encrypted data 124. For example, the offset hashed encrypted data 124 may be "7d093334ba0323c9ffa2956542a93565".

At block 608, the decryption module 128 is to determine the offset value 134 (e.g., see also block 610) by subtracting the further hashed encrypted data 132 from the offset hashed encrypted data 124. For example, the decryption module 128 is to determine the offset value 134 of "9" by subtracting the further hashed encrypted data 132 (e.g., "7d093334ba0323c9ffa2956542a9355c") from the offset hashed encrypted data 124 (e.g., "7d093334ba0323c9ffa2956542a93565").

At block 612, the decryption module 128 is to validate that the offset value 134 corresponds to the key version 110 by determining whether the offset value 134 (e.g., "9") is less than or equal to the specified threshold 136 (e.g., "15").

At block 614, in response to a determination that the offset value 134 is less than or equal to the specified threshold 136, the decryption module 128 is to ascertain the key 108 (e.g., the key 108 corresponding to key version "9") corresponding to the offset value 134.

At block 616, the decryption module 128 is to decrypt the further encrypted data 130 based on the ascertained key 108 corresponding to the offset value 134.

Figure 7:
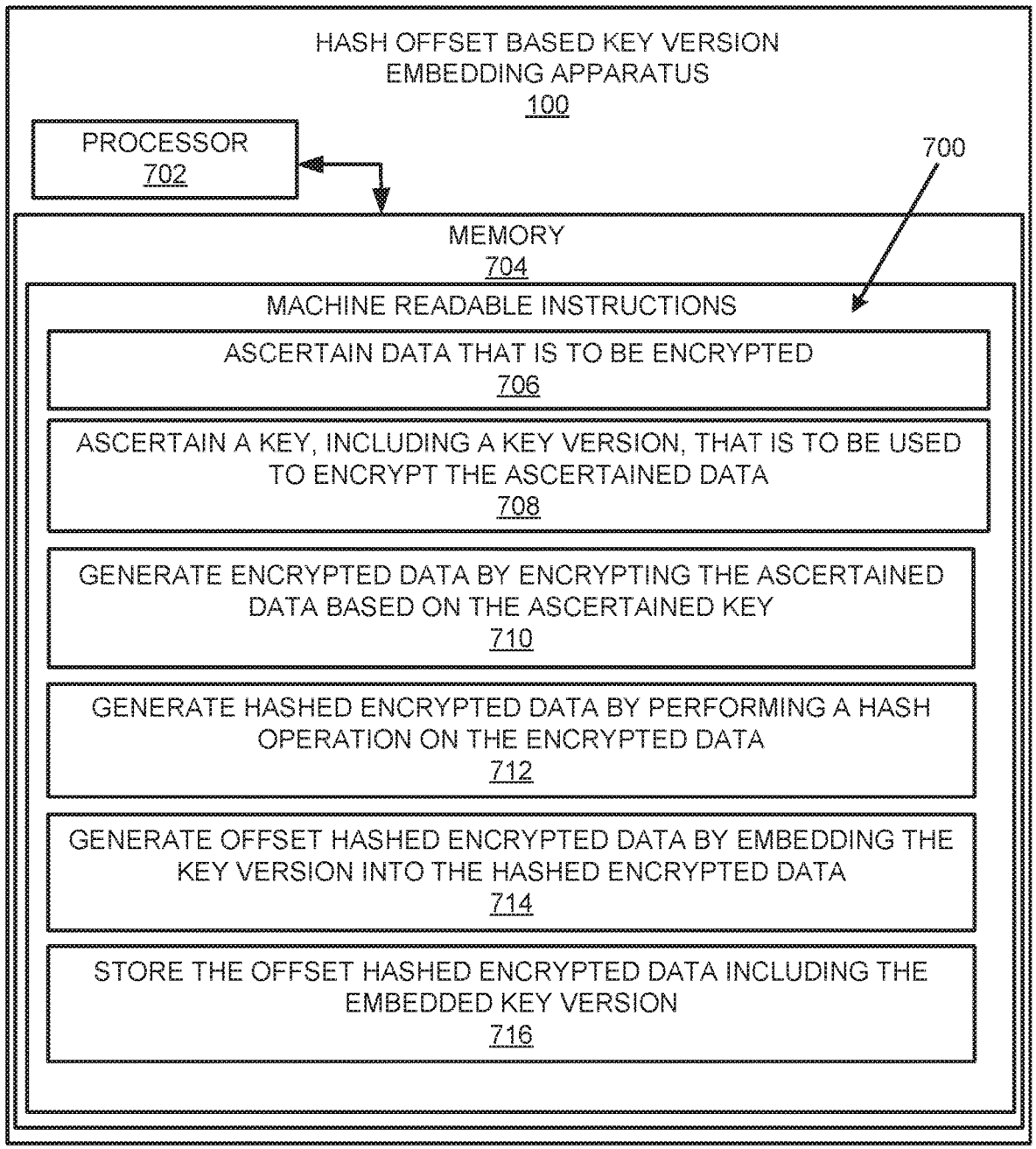
FIG. 7 illustrates an example block diagram for hash offset based key version embedding.
Figure 8:
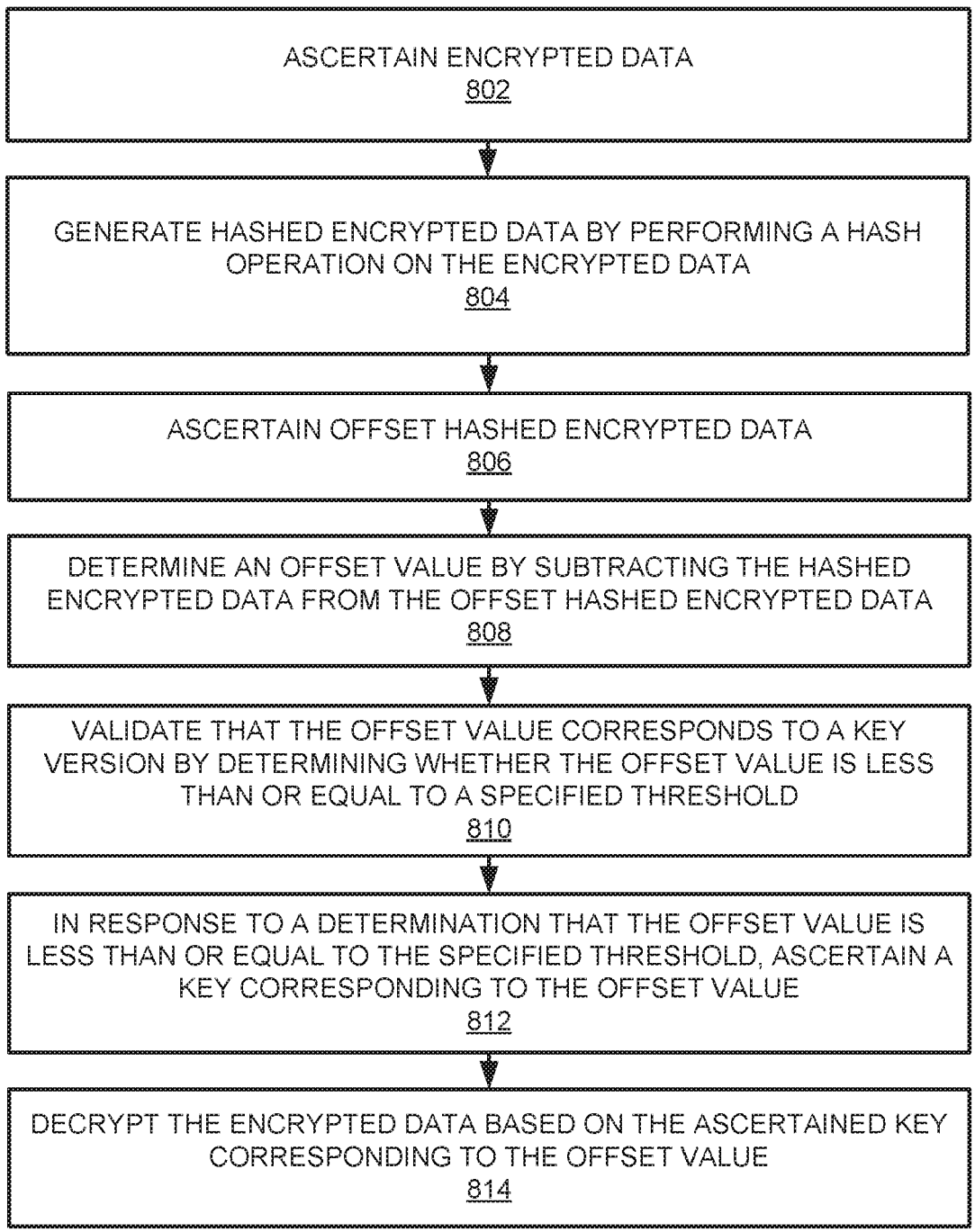
FIG. 8 illustrates an example flowchart of a method for hash offset based key version embedding.
Figure 9:
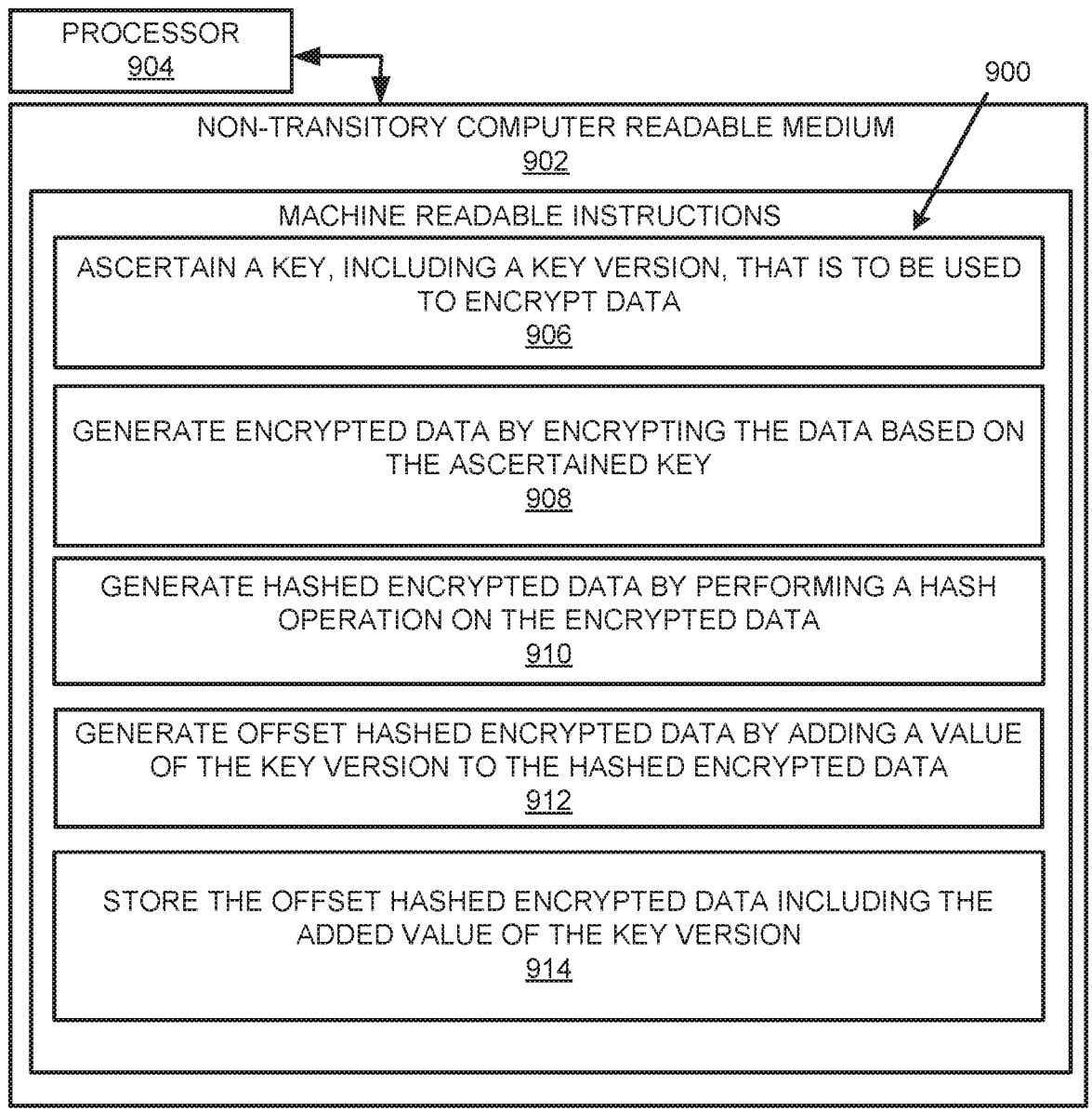
FIG. 9 illustrates a further example block diagram for hash offset based key version embedding.

FIGS. 7-9 respectively illustrate an example block diagram 700, an example flowchart of a method 800, and a further example block diagram 900 for hash offset based key version embedding. The block diagram 700, the method 800, and the block diagram 900 may be implemented on the apparatus 100 described above with reference to FIG. 1 by way of example and not limitation. The block diagram 700, the method 800, and the block diagram 900 may be practiced in other apparatus. In addition to showing the block diagram 700, FIG. 7 shows hardware of the apparatus 100 that may execute the instructions of the block diagram 700. The hardware may include a processor 702, and a memory 704 (i.e., a non-transitory computer readable medium) storing machine readable instructions that when executed by the processor cause the processor to perform the instructions of the block diagram 700. The memory 704 may represent a non-transitory computer readable medium. FIG. 8 may represent a method for hash offset based key version embedding, and the steps of the method. FIG. 9 may represent a non-transitory computer readable medium 902 having stored thereon machine readable instructions to provide hash offset based key version embedding. The machine readable instructions, when executed, cause a processor 904 to perform the instructions of the block diagram 900 also shown in FIG. 9.

The processor 702 of FIG. 7 and/or the processor 904 of FIG. 9 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 902 of FIG. 9), such as hardware storage devices (e.g., RAM (random access memory), ROM (read only memory), EPROM (erasable, programmable ROM), EEPROM (electrically erasable, programmable ROM), hard drives, and flash memory). The memory 704 may include a RAM, where the machine readable instructions and data for a processor may reside during runtime.

Referring to FIGS. 1-7, and particularly to the block diagram 700 shown in FIG. 7, the memory 704 may include instructions 706 to ascertain data 104 that is to be encrypted.

The processor 702 may fetch, decode, and execute the instructions 708 to ascertain a key 108, including a key version 110, that is to be used to encrypt the ascertained data 104.

The processor 702 may fetch, decode, and execute the instructions 710 to generate encrypted data 114 by encrypting the ascertained data 104 based on the ascertained key 108.

The processor 702 may fetch, decode, and execute the instructions 712 to generate hashed encrypted data 118 by performing a hash operation 120 on the encrypted data 114.

The processor 702 may fetch, decode, and execute the instructions 714 to generate offset hashed encrypted data 124 by embedding the key version 110 into the hashed encrypted data 118.

The processor 702 may fetch, decode, and execute the instructions 716 to store the offset hashed encrypted data 124 including the embedded key version 110.

Referring to FIGS. 1-6 and 8, and particularly FIG. 8, for the method 800, at block 802, the method may include ascertaining encrypted data (e.g., the further encrypted data 130).

At block 804 the method may include generating hashed encrypted data (e.g., the further hashed encrypted data 132) by performing a hash operation on the encrypted data (e.g., the further encrypted data 130).

At block 806 the method may include ascertaining offset hashed encrypted data 124.

At block 808 the method may include determining an offset value 134 by subtracting the hashed encrypted data (e.g., the further hashed encrypted data 132) from the offset hashed encrypted data 124.

At block 810 the method may include validating that the offset value 134 corresponds to a key version 110 by determining whether the offset value 134 is less than or equal to a specified threshold 136.

At block 812, in response to a determination that the offset value 134 is less than or equal to the specified threshold 136, the method may include ascertaining a key 108 corresponding to the offset value 134.

At block 814 the method may include decrypting the encrypted data (e.g., the further encrypted data 130) based on the ascertained key 108 corresponding to the offset value 134.

Referring to FIGS. 1-6 and 9, and particularly FIG. 9, for the block diagram 900, the non-transitory computer readable medium 902 may include instructions 906 to ascertain a key 108, including a key version 110, that is to be used to encrypt data 104.

The processor 904 may fetch, decode, and execute the instructions 908 to generate encrypted data 114 by encrypting the data 104 based on the ascertained key 108.

The processor 904 may fetch, decode, and execute the instructions 910 to generate hashed encrypted data 118 by performing a hash operation 120 on the encrypted data 114.

The processor 904 may fetch, decode, and execute the instructions 912 to generate offset hashed encrypted data 124 by adding a value of the key version 110 to the hashed encrypted data 118.

The processor 904 may fetch, decode, and execute the instructions 914 to store the offset hashed encrypted data 124 including the added value of the key version 110.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium storing machine readable instructions that when executed by the processor cause the processor to:
   ascertain data that is to be encrypted;
   ascertain a key, including a key version, that is to be used to encrypt the ascertained data;
   generate encrypted data by encrypting the ascertained data based on the ascertained key;
   generate hashed encrypted data by performing a hash operation on the encrypted data;
   generate offset hashed encrypted data by embedding the key version into the hashed encrypted data; and
   store the offset hashed encrypted data including the embedded key version.

2. The apparatus according to claim 1, wherein the instructions to embed the key version into the hashed encrypted data further comprise instructions to cause the processor to:
   add a value of the key version to the hashed encrypted data.

3. The apparatus according to claim 1, wherein the offset hashed encrypted data represents a value that is offset from the hashed encrypted data by another value corresponding to the key version.

4. The apparatus according to claim 1, wherein the instructions are further to cause the processor to:
   ascertain further encrypted data;
   generate further hashed encrypted data by performing the hash operation on the further encrypted data;
   ascertain the offset hashed encrypted data;
   determine an offset value by subtracting the further hashed encrypted data from the offset hashed encrypted data; and
   validate that the offset value corresponds to the key version by determining whether the offset value is less than or equal to a specified threshold.

5. The apparatus according to claim 4, wherein the instructions are further to cause the processor to:
   in response to a determination that the offset value is less than or equal to the specified threshold, ascertain the key corresponding to the offset value; and
   decrypt the further encrypted data based on the ascertained key corresponding to the offset value.

6. The apparatus according to claim 4, wherein the instructions are further to cause the processor to:
   in response to a determination that the offset value is greater than the specified threshold, indicate that the offset value does not correspond to the key version.

7. The apparatus according to claim 4, wherein the specified threshold corresponds to a total number of key versions including the key version.

8. A computer implemented method comprising:
   ascertaining encrypted data;
   generating hashed encrypted data by performing a hash operation on the encrypted data;
   ascertaining offset hashed encrypted data;
   determining an offset value by subtracting the hashed encrypted data from the offset hashed encrypted data;
   validating that the offset value corresponds to a key version by determining whether the offset value is less than or equal to a specified threshold;
   in response to a determination that the offset value is less than or equal to the specified threshold, ascertaining a key corresponding to the offset value; and
   decrypting the encrypted data based on the ascertained key corresponding to the offset value.

9. The method according to claim 8, further comprising:
   in response to a determination that the offset value is greater than the specified threshold, indicating that the offset value does not correspond to the key version.

10. The method according to claim 8, wherein the specified threshold corresponds to a total number of key versions including the key version.

11. The method according to claim 8, wherein the offset hashed encrypted data is determined by:
    ascertaining data that is to be encrypted;
    ascertaining the key, including the key version, that is to be used to encrypt the ascertained data;
    generating further encrypted data by encrypting the ascertained data based on the ascertained key;
    generating further hashed encrypted data by performing the hash operation on the further encrypted data; and
    generating the offset hashed encrypted data by embedding the key version into the further hashed encrypted data.

12. The method according to claim 11, wherein embedding the key version into the further hashed encrypted data further comprises:
    adding a value of the key version to the further hashed encrypted data.

13. The method according to claim 11, wherein the offset hashed encrypted data represents a value that is offset from the further hashed encrypted data by the offset value corresponding to the key version.

14. A non-transitory computer readable medium having stored thereon machine readable instructions, the machine readable instructions, when executed, cause a processor to:
    ascertain a key, including a key version, that is to be used to encrypt data;
    generate encrypted data by encrypting the data based on the ascertained key;
    generate hashed encrypted data by performing a hash operation on the encrypted data;
    generate offset hashed encrypted data by adding a value of the key version to the hashed encrypted data; and
    store the offset hashed encrypted data including the added value of the key version.

15. The non-transitory computer readable medium according to claim 14, wherein the offset hashed encrypted data represents another value that is offset from the hashed encrypted data by the value of the key version.

16. The non-transitory computer readable medium according to claim 14, wherein the machine readable instructions, when executed, further cause the processor to:
ascertain further encrypted data;
generate further hashed encrypted data by performing the hash operation on the further encrypted data;
ascertain the offset hashed encrypted data;
determine an offset value by subtracting the further hashed encrypted data from the offset hashed encrypted data; and
validate that the offset value corresponds to the key version by determining whether the offset value is less than or equal to a specified threshold.

17. The non-transitory computer readable medium according to claim 16, wherein the machine readable instructions, when executed, further cause the processor to:
in response to a determination that the offset value is less than or equal to the specified threshold, ascertain the key corresponding to the offset value; and
decrypt the further encrypted data based on the ascertained key corresponding to the offset value.

18. The non-transitory computer readable medium according to claim 16, wherein the machine readable instructions, when executed, further cause the processor to:
in response to a determination that the offset value is greater than the specified threshold, indicate that the offset value does not correspond to the key version.

19. The non-transitory computer readable medium according to claim 16, wherein the specified threshold corresponds to a total number of key versions including the key version.

20. The apparatus according to claim 1, wherein the instructions to ascertain the key, including the key version, that is to be used to encrypt the ascertained data further comprise instructions to cause the processor to:
ascertain the key and the key version associated with the key from a plurality of key versions associated with the key.

* * * * *